United States Patent Office 3,478,359
Patented Nov. 11, 1969

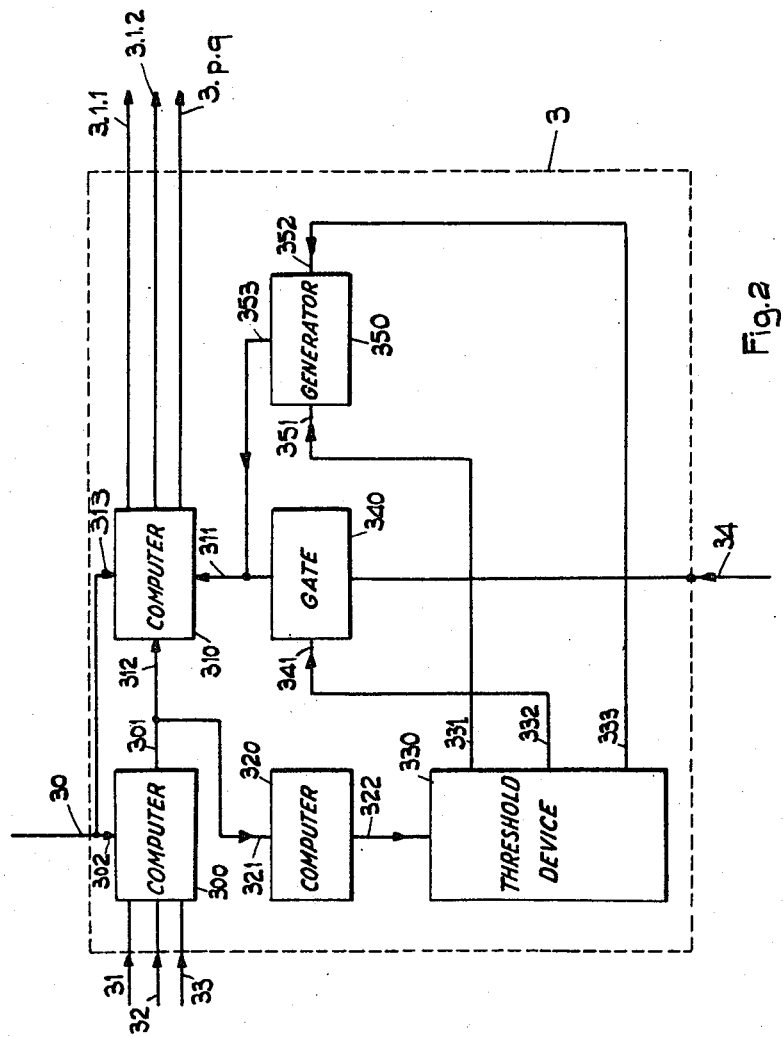

3,478,359
ELECTRONIC SCANNING ANTENNAS USED IN ELECTROMAGNETIC DETECTION
Jacques A. Salmon, Paris, France, assignor to CSF-Compagnie Generale de Telegraphie Sans Fil, a corporation of France
Filed Dec. 20, 1966, Ser. No. 603,711
Claims priority, application France, Dec. 22, 1965, 43,365
Int. Cl. H04b 7/02
U.S. Cl. 343—100                            4 Claims

ABSTRACT OF THE DISCLOSURE

In order to minimize, in pulse radar systems, the drawbacks due to the rounding-off of the respective phase-shift values of the radiating elements of an electronic scanning antenna, the code of the rounding-off, i.e. the function "direction of the phase error" is different for any two adjacent pulses corresponding to the same desired direction of the radiated beam axis.

---

The present invention relates to directive antennae of the type comprising a plurality of radiating elements, and wherein the scanning of a given angle by the beam is produced by phase shifting the various radiating elements with respect to each other.

To obtain a given deviation of the radiation direction of the antenna, it is known to phase shift each element with respect to the others by a value which, instead of being exactly that necessary, is an approximate value selected amongst a plurality of quantization levels.

A systematic phase error, due to this quantization, therefore occurs at each element. Assigning the + sign to a phase error if the actually selected phase value is higher than the desired value, and the − sign in the opposite case, the directions of the errors for the whole antenna will be symbolized by a succession of + and − signs, which forms a code. Generally, this code is preferably predetermined. The succession of + and − signs which forms the code defines a "direction of the phase error" function which may assume two different values. The presence of secondary lobes due to the quantization, in the diagram of the antenna, corresponds to the presence of maxima in the spectrum of this "direction of the phase error" function (wherein the spectrum of a function is the Fourier transform of this function).

In pulse radar, generally, several successive pulses are used to form a signal. All other facts being equal however, if, as was the practice hitherto, the code is not changed for two successive pulses, the radiation diagram of the antenna remains the same for the two pulses and the relation between the useful signal and the parasitic signal, following from the existence of lateral lobes due to the systematic phase errors in the diagram, does not change.

According to the invention, there is provided an electronic scanning antenna, for pulse radar systems using several pulses for forming a radar signal in any desired direction of the beam of said antenna, comprising: an array of a plurality of radiating elements; power feeding means common to said elements; a plurality of controlled phase shifting means, respectively connected between said radiating elements and said common means for shifting the phase of said radiating elements by quantized amounts and having respective control inputs; computing means for computing the phase of each radiating element for said desired direction of the beam of said antenna and for determining said quantized amounts, said computing means having data inputs, a plurality of outputs, respectively connected to said control inputs, and a direction-of-the-phase-error input; and controlling means, connected to said direction-of-the-phase-error input for indicating to said computing means the direction of the phase error in the determination of each of said quantized amounts, according to a code different for any two adjacent pulses in said desired direction of the beam.

In this way, the importance of the parasitic signal will be reduced. More particularly, from one pulse to the next, it is possible to use two codes so selected that the corresponding "direction of the phase error" functions have spectra whose maxima are offset in such a way that the maxima of one of the spectra correspond to the minima of the other. In this manner, whilst the useful signal does not change from one pulse to the next, the parasitic signal will be, for example, present in the first, and absent or very attenuated in the second. After summation, one gains therefore about 3 db in the importance of the parasitic signals resulting from the presence of secondary lobes, due to the quantization.

For a better understanding of the invention and to show how the same may be carried into effect reference will be made to the drawings accompanying the following description, and in which:

FIG. 2 shows a preferred embodiment of a detail of the electronic scanning antenna according to the invention.

Figure 1:
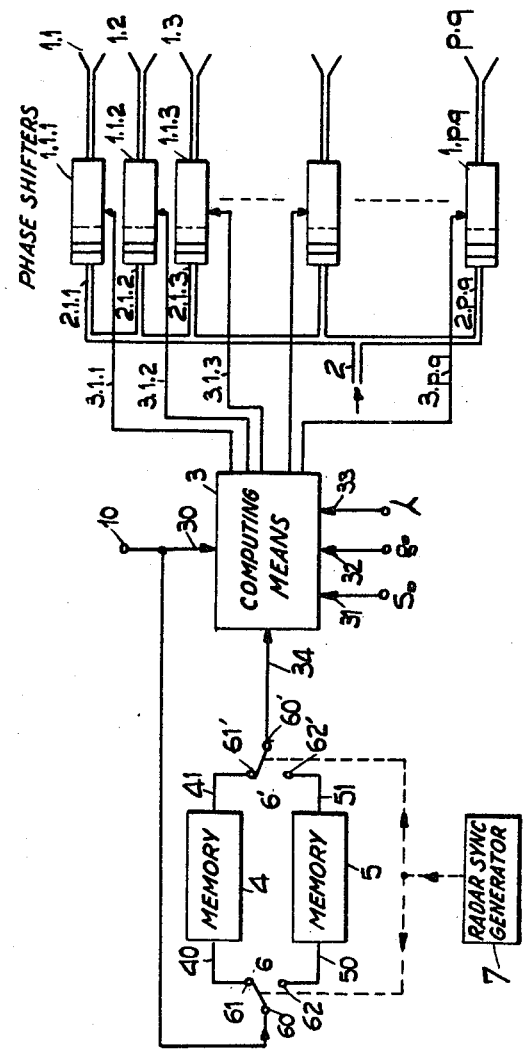
FIG. 1 shows an embodiment of the electronic scanning antenna according to the invention.

FIG. 1 shows an electronic scanning antenna comprising an array of radiating elements $i.j.$ located on a surface or along a line, where $i$ is a whole number between 1 and $p$ and $j$ is a whole number between 1 and $q$. These elements are respectively connected to phase shifters $1.i.j.$, which can introduce phase shifts having quantized values between their inputs and their outputs. These phase shifters are supplied with ultra-high frequency power from a common main connection 2, through connections $2.i.j.$ which distribute the ultra-high frequency power between the various radiating elements.

The value of the quantized phase shifts introduced by the phase shifters $1.i.j.$ is controlled by a phase computer 3 through connections $3.i.j.$, respectively. The computer 3 has inputs 31, 32, 33, respectively receiving the instantaneous theoretically desired elevation $s_0$ and bearing $g_0$, and the value of the operating wavelength $\lambda$.

The input 30 of the computer 3 is connected to the terminal 10 and its input 34 to the terminal 60' of a switch 6'. The terminals 61' and 62' of the switch 6' are respectively connected to outputs 41 and 51 of memories 4 and 5. The inputs 40 and 50 of the memories 4 and 5 are respectively connected to terminals 61 and 62 of the switch 6, which is synchronized with the switch 6'. Switches 6 and 6' are controlled by a radar synchronizing signal generator 7. The terminal 60 of the switch 6 is connected to the terminal 10.

The operation is as follows:

The memories 4 and 5 respectively store two codes, each representing the directions of the phase errors at the various elements of the antenna. These two codes are such that the spectra of the corresponding "direction of the phase error" functions, present offset maxima, the maxima of one spectrum corresponding to the minima of the other.

For one of the ultra-high frequency pulses in a given direction of radiation of the antenna, the switches 6 and 6' connect, for example, respectively the terminals 60 and 61 and 60' and 61'.

The memory 4 and the computer 3 are therefore controlled simultaneously, for example, by means of a program applied to the terminal 10, so that the memory 4 supplies at its output 41, and therefore to the input 34 of the computor, the indication of the error sign for each phase shifted at the instant when the quantized phase shift, which this phase shifter must supply for a given elevation and bearing, is being calculated by the computer 3 from the indications, $s_o$, $g_o$ and $\lambda$, which are supplied thereto. During the next ultra-high frequency pulse for the same direction of radiation of the antenna, the switches 6 and 6' are switched by means of a signal supplied by the generator 7 and respectively connect the terminals 60 and 62, and 60' and 62'. The computer 3 calculates therefore the values of the quantized phase shifts for the various radiating elements with a direction of error for each element, which is determined by the code stored in the memory 5.

However, preferably, where the rounding off to the nearest quantization level introduces only a small error (for example, less than a quarter of the quantization step) the computer does not change the direction of the error, even if this is indicated in the used code. In fact, in this case it is preferable not to change the direction of error, because the absolute value of this error would become much larger (for example, more than three quarters of the quantization step).

To this end, one can use the computer which is shown, by way of example, in FIGURE 2.

The computer 3 is shown there with the same reference numerals as in FIG. 1 for its inputs and its outputs. It comprises a phase computing device 300 which calculates the exact phase shift to be applied to each element for a given direction. This device is connected to the inputs 30, 31, 32 and 33. Its output 301 is connected to the input 321 of a further computer 320. The output 322 of the computer 320 is connected to a threshold device 330 having three outputs 331, 332 and 333. The outputs 331 and 333 are connected, respectively, to inputs 351 and 352 of a generator 350 generating error-direction signals and whose output 353 is connected to the input 311 of the computer 310 calculating the rounded-off-value. The output 332 of the device 330 is connected to the control input 341 of a gate circuit 340, mounted between the input 34 of the computer 3 and the input 311 of the rounded-off-value computer 310, whose input 313 is connected to the input 30 of the computer 3. The outputs of the rounded-off-value computer 310 form the outputs 3.$i.j$. of the computer 3.

The operation is as follows:

Let $\Phi_{i.j.o}$ be the phase shift which is exactly necessary for the element $i.j.$ for obtaining the pointing of the beam of the antenna along a given direction $D_o$, and $\Phi$ be the quantization step. Then:

$$\Phi_{i.j.o} = k_{i.j.} \Phi + \gamma_{i.j.}$$

where $k_{i.j.}$ is a whole number and $\gamma_{i.j.}$ is so that $0 \leqslant \gamma_{i.j.} < \Phi$.

If $\gamma_{i.j.}$ is between 0 and $\mu$, where $\mu$ is a small number (for example smaller than $\Phi/4$), the phase shift to be introduced by the phase shifter 1.$i.j.$ must be rounded-off to the quantized level lower than $\Phi_{i.j.o}$, so that the occurring error does not become too large (for example, larger than $3\Phi/4$). Similarly, if $\gamma_{i.j.}$ is between $\nu$ and $\Phi$, where $\nu$ is a high number (for example, higher than $3\Phi/4$) but lower than $\Phi$, the phase shift to be introduced by the phase shifter 1.$i.j.$ must be rounded off to the higher quantized level. Finally, if $\gamma_{i.j.}$ is between $\mu$ and $\nu$, the direction of the phase error will be that indicated by the used code.

The computers 300 and 310 are controlled by means of a program applied to the input 30. The computer 300 calculates the exact value $\Phi_{i.j.o}$ for a given direction, from the value for $\lambda$, $s_o$ and $g_o$. Each value $\Phi_{i.j.o}$ is fed to the computer 320 which carries out the division of $\Phi_{i.j.o}$ by $\Phi$ and supplies at its output 322 the value of $\lambda_{i.j.}$. This value is fed into the device 330 which supplies a signal at its output 331 if $0 \leqslant \gamma_{i.j.} \leqslant \mu$ and supplies a signal at its output 333 if $\nu \leqslant \gamma_{i.j.} < \Phi$, and which simultaneously supplies a signal at its output 332, $\lambda_{i.j.}$ is outside the interval between $\mu$ and $\nu$.

If $\gamma_{i.j.}$ is within this interval, no signal is supplied by the device 330, the gate circuit 340 is open and the rounded-off-value computer 310 calculates the value of the quantized phase shift for the source $i.j.$ from the value $\Phi_{i.j.o}$ fed into its input 312 and from the direction of the phase error determined by the used code and transmitted from the input 34 to its input 311. If $0 \leqslant \gamma_{i.j.} \leqslant \mu$, a signal is supplied at the outputs 331 and 332 of the device 330. The signal transmitted to the input 341 of the gate circuit 340 blocks the same and the signal transmitted to the input 351 of the generator 350 controls the formation of a signal controlling the direction of the phase error towards the lower quantized level. This signal about the direction of the phase error is transmitted to the input 311 of the computer 310 which rounds off the value of $\Phi_{i.j.o}$ to the lower quantized level without regard to the signal supplied to the input 34.

If $\nu \leqslant \gamma_{i.j.} < \Phi$, a signal is supplied at the outputs 332 and 333 of the device 330. The signal transmitted to the input 341 of the gate circuit 340 blocks the same and the signal transmitted to the input 352 of the generator 350 controls the formation of a signal controlling the direction of the phase error towards the higher quantized level. This signal about the direction of the phase error is transmitted to the input 311 of the computer 310 which rounds off the value of $\Phi_{i.j.o}$ to the higher quantized level without regard to the signal supplied to the input 34.

Of course, the invention is not limited to the embodiment described which has been given solely by way of example and, more particularly, the change of code according to the present invention between two successive pulses does not affect in any way what may be done between the transmission and the reception of a given pulse, between which transmission and reception the code may also be changed. In addition, it is possible to use, for example, $n$ codes if $n$ pulses are used for forming a signal relative to a given direction, in which case the switches 6 and 6' have $n$ positions.

What is claimed is:

1. An electronic scanning antenna, for pulse radar systems using several pulses for forming a radar signal in any desired direction of the beam of said antenna, comprising: an array of a plurality of radiating elements; power feeding means common to said elements, a plurality of controlled phase shifting means, respectively connected between said radiating elements and said common means for shifting the phase of said radiating elements by quantized amounts and having respective control inputs; computing means for computing the phase of each radiating element for said desired direction of the beam of said antenna and for determining said quantized amounts, said computing means having data inputs, a plurality of outputs, respectively connected to said control inputs, and a direction-of-the-phase-error input; and controlling means, connected to said direction-of-the-phase-error input for indicating to said computing means the direction of the phase error in the determination of each of said quantized amounts, according to a code different for any two adjacent pulses in said desired direction of the beam.

2. An electronic scanning antenna as claimed in claim 1, wherein said controlling means comprise: $n$ memories for respectively storing $n$ different codes; and switching means for selectively coupling said memories to said direction-of-the-phase-error input, in synchronism with the transmission of said pulses in said desired direction of the beam.

3. An electronic scanning antenna as claimed in claim 2, wherein $n$ is equal to 2 and wherein said two codes determine "direction of the phase error" functions having different spectra, the maxima of one of said spectra corresponding to the minima of the other.

4. An electronic scanning antenna as claimed in claim 1, wherein said computing means comprise: a first computer for computing the phase of each radiating element for said desired direction of the beam; a second computer coupled to said first computer for receiving therefrom said phases and determining said quantized amounts, said second computer having a direction-of-the-phase-error input; a gate connected between said direction-of-the-phase-error inputs of said computing means and of said second computer, said gate having a control input; a generator connected to said direction-of-the-phase-error input of said second computer for providing direction-of-the-phase-error signals, said generator having control inputs; a third computer connected to said first computer for computing the rests of the divisions of each of said radiating source phases by the quantization step; and a threshold device connected to said third computer and having a first output connected to said control input of said gate and second outputs connected to said control inputs of said generator, for opening said gate upon said rests being inside a predetermined interval lower than the quantization step and for causing said generator to provide a direction-of-the-phase-error signal controlling the rounding off of said phase of each of said radiating element to the nearest quantized amount upon said corresponding rest being outside said predetermined interval.

References Cited
UNITED STATES PATENTS 3,387,301   6/1968   Blass et al. _____ 343—100

RODNEY D. BENNETT, Jr., Primary Examiner

T. H. TUBBESING, Assistant Examiner

U.S. Cl. X.R.

343—854